United States Patent
Son et al.

(10) Patent No.: US 9,075,279 B2
(45) Date of Patent: Jul. 7, 2015

(54) DISPLAY DEVICE

(71) Applicant: Samsung Display Co., Ltd., Yongin (KR)

(72) Inventors: Ock Soo Son, Seoul (KR); Young Gu Kang, Hwaseong-si (KR); Hyun Wuk Kim, Yongin-si (KR); Jean Ho Song, Yongin-si (KR); Eun Je Jang, Hwaseong-si (KR); Sung Jin Hong, Seoul (KR)

(73) Assignee: Samsung Display Co., Ltd., Yongin (KR)

( * ) Notice: Subject to any disclaimer, the term of this patent is extended or adjusted under 35 U.S.C. 154(b) by 43 days.

(21) Appl. No.: 14/086,627

(22) Filed: Nov. 21, 2013

(65) Prior Publication Data

US 2014/0285744 A1   Sep. 25, 2014

(30) Foreign Application Priority Data

Mar. 25, 2013   (KR) .................. 10-2013-0031607

(51) Int. Cl.
*G02F 1/1362*   (2006.01)
*G02F 1/1343*   (2006.01)

(52) U.S. Cl.
CPC .... *G02F 1/136286* (2013.01); *G02F 1/136204* (2013.01); *G02F 1/136209* (2013.01); *G02F 2001/134372* (2013.01); *G02F 2001/136222* (2013.01)

(58) Field of Classification Search
CPC ..................... H01L 29/7869; H01L 29/41733; H01L 29/78633; H01L 29/45; H01L 29/458; H01L 29/786; H01L 29/78663; H01L 29/78669; H01L 29/78678; H01L 29/78693; H01L 27/3244; H01L 27/1214; H01L 27/3276; H01L 27/3262; H01L 27/1288; H01L 27/1251; H01L 27/3211; H01L 27/3272; H01L 51/5237; H01L 51/0023; G09G 2300/08; G09G 2300/0426; G09G 2300/0439; G09G 3/3648; G02F 1/1345; G02F 1/136286; G02F 1/133514; G02F 1/136209; G02F 1/1333; G02F 1/133512; G02F 1/134309; G02F 1/13452; G02F 1/1368; G02F 1/13458; G02F 1/136204; G02F 1/1303; G02F 1/133509; G02F 1/134336; G02F 1/136227; G02F 1/133345; G02F 1/136; G02F 1/1362; G02F 1/1335; G02F 1/1343; G02F 2001/133357; G02F 2201/52
USPC ................ 257/59, 43, 72, E21.577, E27.111, 257/E29.273, E21.259, E21.303, E21.411, 257/E29.095, E29.101; 345/204, 87, 92, 345/205, 55, 83; 438/149, 158, 151, 155, 438/652, 666, 669; 349/139, 106, 187, 40, 349/110, 149, 151, 158, 108, 138, 143, 147, 349/43, 141
See application file for complete search history.

(56) References Cited

U.S. PATENT DOCUMENTS 6,417,900 B1 * 7/2002 Shin et al. ..................... 349/110
6,590,627 B2 * 7/2003 Tomioka et al. .............. 349/139

(Continued)

FOREIGN PATENT DOCUMENTS

| JP | 2008-020772 | 1/2008 |
|---|---|---|
| JP | 2011-170200 | 9/2011 |
| KR | 10-2007-0072141 | 7/2007 |

(Continued)

*Primary Examiner* — Thoi Duong
(74) *Attorney, Agent, or Firm* — H.C. Park & Associates, PLC

(57) ABSTRACT

A display device includes a first substrate, a ground electrode disposed on the first substrate, a thin film transistor disposed on the first substrate, a first passivation layer disposed on the thin film transistor, a light blocking member, and a color filter disposed on the first passivation layer. A field generating electrode is disposed on the light blocking member and the color filter. The ground electrode is arranged on the first substrate in a matrix and is connected to a ground terminal.

20 Claims, 5 Drawing Sheets

(56) References Cited

U.S. PATENT DOCUMENTS 8,284,376 B2 10/2012 Kim
2013/0271683 A1 10/2013 Jang et al.

FOREIGN PATENT DOCUMENTS

KR 10-2008-0003114 1/2008
KR 10-2011-0035145 4/2011

* cited by examiner

DISPLAY DEVICE

CROSS-REFERENCE TO RELATED APPLICATION

This application claims priority from and the benefit of Korean Patent Application No. 10-2013-0031607, filed on Mar. 25, 2013, which is hereby incorporated by reference for all purposes as if fully set forth herein.

BACKGROUND

1. Field

Exemplary embodiments of the present invention relate to a display device.

2. Discussion of the Background

A liquid crystal display is one of the most common types of flat panel displays currently in use, and includes a display device that applies a voltage to field generating electrodes such as a pixel electrode and a common electrode to rearrange liquid crystal molecules of the liquid crystal layer so that the amount of light passing through the liquid crystal layer may be controlled.

A light blocking member is formed to prevent light leakage in a non-display area of the liquid crystal display. If the light blocking member is formed on another substrate facing a substrate on which a pixel electrode is formed, light leakage in the non-display area may not be prevented and transmittance of a display area may be reduced due to misalignment of the two substrates.

Therefore, the light blocking member may be formed on the substrate on which the pixel electrode is formed.

However, when constituent elements such as the light blocking member are formed on a single substrate, static electricity generated in the substrate is trapped and is not discharged properly, which may cause a defect such as signal distortion.

The above information disclosed in this Background section is only for enhancement of understanding of the background of the invention and therefore it may contain information that does not form the prior art that is already known in this country to a person of ordinary skill in the art.

SUMMARY

Exemplary embodiments of the present invention provide a display device including a ground electrode through which static electricity may be discharged.

Additional features of the invention will be set forth in the description which follows, and in part will be apparent from the description, or may be learned by practice of the invention.

An exemplary embodiment of the present invention discloses a display device including: a first substrate; a ground electrode disposed on the first substrate; a thin film transistor disposed on the first substrate; a first passivation layer disposed on the thin film transistor; a light blocking member and a color filter disposed on the first passivation layer; and a field generating electrode disposed on the light blocking member and on the color filter. The ground electrode is arranged on the first substrate in a matrix shape and is connected to a ground terminal It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate exemplary embodiments of the invention, and together with the description serve to explain the principles of the invention.

DETAILED DESCRIPTION OF THE ILLUSTRATED EMBODIMENTS

Figure 1:
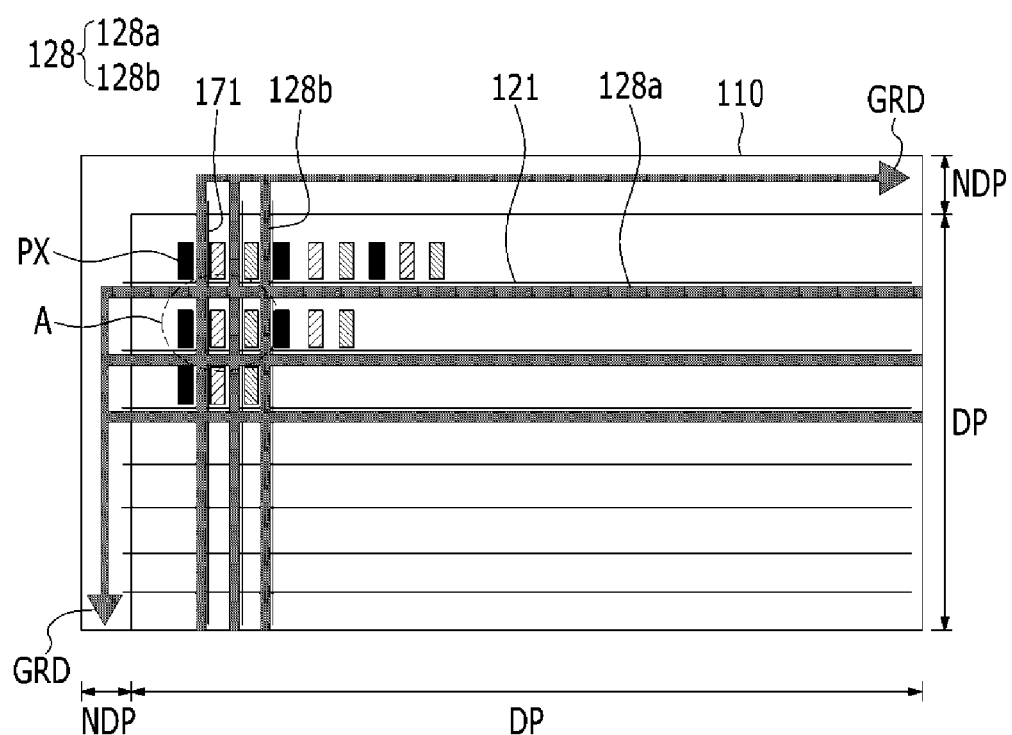
FIG. 1 is a schematic layout view illustrating a display device according to an exemplary embodiment of the present invention.

The invention is described more fully hereinafter with reference to the accompanying drawings, in which exemplary embodiments of the invention are shown. This invention may, however, be embodied in many different forms and should not be construed as limited to the exemplary embodiments set forth herein. Rather, these exemplary embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

It will be understood that when an element or layer is referred to as being "on" or "connected to" another element or layer, it can be directly on or directly connected to the other element or layer, or intervening elements or layers may be present. In contrast, when an element or layer is referred to as being "directly on" or "directly connected to" another element or layer, there are no intervening elements or layers present. It will be understood that for the purposes of this disclosure, "at least one of X, Y, and Z" can be construed as X only, Y only, Z only, or any combination of two or more items X, Y, and Z (e.g., XYZ, XYY, YZ, ZZ).

FIG. 1 is a schematic layout view illustrating a display device according to an exemplary embodiment of the present invention.

Referring to FIG. 1, the display device includes a gate line 121 extending in a horizontal direction, and a data line 171 crossing the gate line 121 and extending in a vertical direction on a first substrate 110. A plurality of pixels PX is disposed on the first substrate 110, each of which may be formed of the gate line 121 and the data line 171, and a ground electrode 128 is also disposed on the first substrate 110.

The ground electrodes 128 are arranged in a matrix in a display area DP. The ground electrode 128 includes a first ground electrode 128a extending in a direction parallel to the gate line 121 and a second ground electrode 128b extending in a direction parallel to the data line 171.

Each of the first ground electrodes 128a and the second ground electrodes 128b is arranged in the display area DP and extends to a non-display area NDP to be connected to a ground terminal GRD. Therefore, static electricity generated on the surface of the first substrate 110 is discharged to the ground terminal GRD, thereby reducing any defect caused by static electricity.

Hereinafter, a feature of the ground electrode 128 according to the present exemplary embodiment will be described in more detail.

Figure 2:
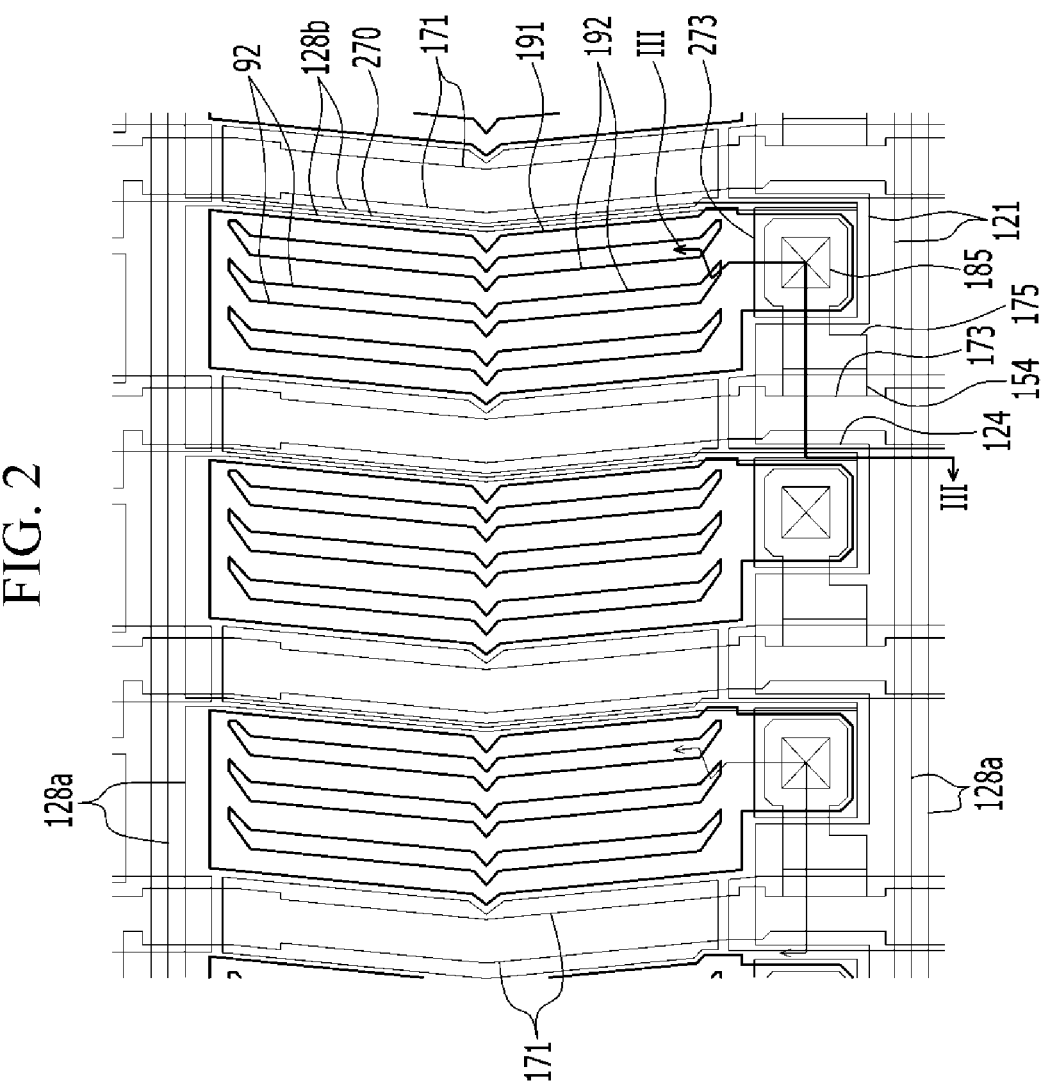
FIG. 2 is a top plan view illustrating a liquid crystal display according to an exemplary embodiment of the present invention.
Figure 3:
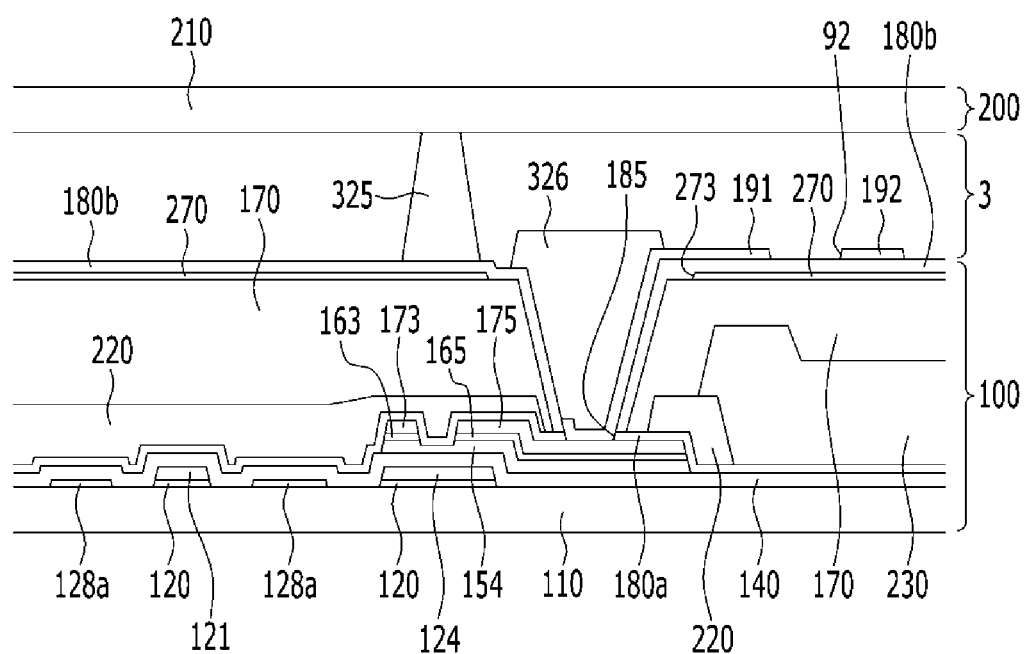
FIG. 3 is a cross-sectional view taken along line III-III of FIG. 2.

FIG. 2 is a top plan view illustrating a liquid crystal display according to an exemplary embodiment of the present invention. FIG. 3 is a cross-sectional view taken along line III-III of FIG. 2. FIG. 2 is an enlarged view of region A of FIG. 1.

Referring to FIG. 2 and FIG. 3, the liquid crystal display includes a lower panel 100 provided with a first substrate 110, an opposing upper panel 200 provided with a second substrate 210, and a liquid crystal layer 3 injected therebetween.

A ground electrode 128 and a residual ground electrode 120, which are made of a transparent material or an opaque material are disposed on the first substrate 110, which is made of transparent glass or plastic. A gate line 121 including a gate electrode 124 is disposed on the residual ground electrode 120. The residual ground electrode 120 and the gate line 121 may have substantially the same planar shape.

The gate line 121 includes not only the gate electrode 124, but also a wide end portion (not illustrated) for connection with another layer or an external driving circuit. The gate line 121 may be made of an aluminum-based metal such as aluminum (Al) or an aluminum alloy, a silver-based metal such as silver (Ag) or a silver alloy, a copper-based metal such as copper (Cu) or a copper alloy, a molybdenum-based metal such as molybdenum (Mo) or a molybdenum alloy, chromium (Cr), tantalum (Ta), or titanium (Ti). However, the gate line 121 may have a multilayer structure including at least two conductive layers having different physical properties.

The ground electrode 128 includes a first ground electrode 128a extending in a direction parallel to the gate line 121 from a location adjacent to the gate line 121, and a second ground electrode 128b connected to the first ground electrode 128a and extending in a direction parallel to the data line 171. The first ground electrode 128a is disposed on the same layer as the residual ground electrode 120, and is not connected to and is insulated from the residual ground electrode 120 and the gate line 121. The second ground electrode 128b is connected to only one of two adjacent first ground electrodes 128a. This allows structure in which the second ground electrode 128b does not cross the gate line 121 and is insulated therefrom.

In a plan view, the second ground electrode 128b is disposed at a location adjacent to the data line 171, but may also be disposed overlapping the data line 171. However, the second ground electrode 128b is formed so as not to cross the gate electrode 124 included in the gate line 121.

Here, the ground electrode 128 and the gate line 121 may be formed by one process. After forming a transparent electrode material such as ITO and a metal material on the first substrate 110, a photosensitive film is applied and a half-tone process is used to form a photosensitive film pattern including a first portion where the gate line 121 is formed, a second portion where the ground electrode 128 is formed, and a third portion from which the gate line 121 and the ground electrode 128 are removed. The metal material and the transparent electrode material are patterned by using the photosensitive film pattern formed as a mask to form the ground electrode 128 and the gate line 121. In this case, the transparent electrode material disposed below the gate line 121 remains to form the residual ground electrode 120.

A gate insulating layer 140 made of silicon nitride ($SiN_x$) or silicon oxide ($SiO_x$) is disposed on the ground electrode 128 and the gate line 121. The gate insulating layer 140 may have a multilayer structure including at least two insulating layers having different physical properties.

A semiconductor layer 154 made of amorphous silicon or polysilicon is disposed on the gate insulating layer 140. The semiconductor layer 154 may include an oxide semiconductor.

Ohmic contacts 163 and 165 are formed on the semiconductor layer 154. The ohmic contacts 163 and 165 may be made of a material such as n+ hydrogenated amorphous silicon on which n-type impurity such as phosphorus is doped at a high concentration or silicide. The ohmic contacts 163 and 165 may be located on the semiconductor layer 154. When the semiconductor layer 154 is an oxide semiconductor, the ohmic contacts 163 and 165 may be omitted.

A data conductor including the data line 171 including a source electrode 173 and a drain electrode 175 is formed on the ohmic contacts 163 and 165 and the gate insulating layer 140.

The data line 171 includes a wide end portion (not illustrated) for connection with another layer or an external driving circuit. The data line 171 transfers a data signal and extends mainly in a vertical direction to cross the gate line 121.

The data line 171 may have a first bent portion having a bent shape to obtain maximum transmittance of the liquid crystal display, and the first bent portions may meet each other at an intermediate region of the pixel area to form a V shape. A second bent portion, which is bent to form an angle with the first bent portion, may be further formed in the intermediate region of the pixel area.

The first bent portion of the data line 171 may be bent to form an angle of about an angle of 7 degrees with respect to a vertical reference line that forms a 90° angle with the direction in which the gate line 121 extends. The second bent portion disposed in the intermediate region of the pixel area may be further bent to form an angle of about an angle of 7 degrees to about an angle of 15 degrees with respect to the first bent portion.

The source electrode 173 corresponds to a part of the data line 171 and is disposed on the same line as the data line 171. The drain electrode 175 is formed to extend parallel to the source electrode 173. Therefore, the drain electrode 175 is parallel to a part of the data line 171.

The gate electrode 124, the source electrode 173, and the drain electrode 175 form a thin film transistor (TFT) together with the semiconductor 154, and a channel of the thin film transistor is formed on the semiconductor 154 between the source electrode 173 and the drain electrode 175.

The liquid crystal display according to the exemplary embodiment of the present invention includes the source electrode 173 that extends from the data line 171, and the drain electrode 175 that extends parallel to the data line 171, so that the width of the thin film transistor may be increased without increasing an area of the data conductor, thereby increasing an aperture ratio of the liquid crystal display.

The data line 171 and the drain electrode 175 may be made of a refractory metal such as molybdenum, chromium, tantalum, and titanium, or an alloy thereof, and have a multilayer structure including a refractory metal layer (not illustrated) and a low resistance conductive layer (not illustrated). An example of the multilayer structure includes a double layer including a chromium or molybdenum (alloy) lower layer and an aluminum (alloy) upper layer, and a triple layer including a molybdenum (alloy) lower layer, an aluminum (alloy) intermediate layer, and a molybdenum (alloy) upper layer. However, the data line 171 and the drain electrode 175 may be made of various metals or conductors in addition to the above-mentioned materials.

A first passivation layer 180a is formed on the data conductor 171, 173, and 175, the gate insulating layer 140, and the exposed portion of the semiconductor 154. The first passivation layer 180a may be made of an organic insulating material or an inorganic insulating material.

A light blocking member 220 is disposed on the first passivation layer 180a. The light blocking member 220 may be disposed at a location overlapping the ground electrode 128, the gate line 121, the data line 171, and the semiconductor 154. Even though not illustrated, the light blocking members 220 may be arranged in a matrix. The light blocking member 220 is removed from a region corresponding to the periphery of the drain electrode 175.

A color filter 230 is disposed on the light blocking member 220 and the first passivation layer 180a. The color filter 230 may inherently display a primary color. Examples of the primary colors include primary colors such as red, green, and blue, or yellow, cyan, or magenta. Even though not illustrated, the color filter may further include a color filter displaying a mixed color of the primary colors, or white. The color filter 230 is removed from the region corresponding to the periphery of the drain electrode 175.

An organic layer 170 is disposed on the color filter 230. The organic layer 170 prevents a pigment of the color filter 230 from being introduced to the liquid crystal layer 3, and also planarizes lower layers.

A common electrode 270 is disposed on the organic layer 170. The common electrode 270 has a planar shape, may be formed on the entire first substrate 110 as a plate, and may have an opening 273 formed in the region corresponding to the periphery of the drain electrode 175. That is, the common electrode 270 may have a planar shape.

The common electrodes 270 disposed on adjacent pixels are connected to each other to receive a common voltage having a level supplied from the outside of the display area.

A second passivation layer 180b is disposed on the common electrode 270. The second passivation layer 180b may be made of an organic insulating material or an inorganic insulating material.

A pixel electrode 191 is disposed on the second passivation layer 180b. The pixel electrode 191 includes a bent edge which is substantially parallel to the first bent portion and the second bent portion of the data line 171. The pixel electrode 191 includes cutouts 92, and first branch electrodes 192 defined by the cutouts 92.

A first contact hole 185 is formed in the first passivation layer 180a and the second passivation layer 180b to expose the drain electrode 175. The pixel electrode 191 is physically and electrically connected to the drain electrode 175 through the first contact hole 185 to receive a voltage from the drain electrode 175.

Even though not illustrated, an alignment layer is applied on the pixel electrode 191 and the second passivation layer 180b, and may be a horizontal alignment layer, and is rubbed in a direction. However, in a liquid crystal display according to another exemplary embodiment of the present invention, the alignment layer may contain a photo-reactive material to be photo-aligned.

A spacer 325 is disposed between the first substrate 110 and the second substrate 210.

The spacer 325 serves to maintain a distance between the first substrate 110 and the second substrate 210, which faces the first substrate 110.

A colored member 326 is disposed at a location corresponding to the first contact hole 185.

The colored member 326 is disposed around the first contact hole 185 to serve to prevent light leakage around the first contact hole 185 and to compensate for a step generated by the first contact hole 185.

The spacer 325 and the colored member 326 may be made of the same material.

A liquid crystal layer 3 is disposed between the first substrate 110 and the second substrate 210.

The liquid crystal layer 3 includes a nematic liquid crystal material having positive dielectric anisotropy. The liquid crystal molecules of the liquid crystal layer 3 have a structure in which a major-axis direction thereof is parallel to the substrates 110 and 210, and the direction is twisted at an angle of 90 degrees in a spiral shape from the rubbing direction of the alignment layer of the first substrate 110 to the second substrate 210.

The pixel electrode 191 receives a data voltage from the drain electrode 175, and the common electrode 270 receives a reference voltage having a level from a reference voltage applying unit disposed outside the display area.

The pixel electrode 191 and the common electrode 270, which are field generating electrodes, generate an electric field so that liquid crystal molecules of the liquid crystal layer 3 positioned on the two electrodes 191 and 270 rotate in a direction parallel to the direction of the electric field. Polarization of light which passes through the liquid crystal layer varies according to the rotation direction of the liquid crystal molecules determined as described above.

As such, in the liquid crystal display according to the exemplary embodiment of the present invention, the pixel electrode 191 and the common electrode 270 are formed on the first substrate 110, and the color filter 230 and the light blocking member 220 are also formed on the first substrate 110. Accordingly, it is possible to prevent light leakage or deterioration in aperture ratio caused by misalignment between the first substrate 110 and the second substrate 210.

Further, in the liquid crystal display according to the exemplary embodiment of the present invention, the light blocking member 220, the color filter 230, and the organic layer 170 are disposed on the lower panel 100 so that a thickness between the first substrate 110 and the common electrode 270, which is one of the field generating electrodes, is increased. Therefore, any static electricity generated on the first substrate 110 is not properly discharged so that contrast is not accurately represented on a screen when the liquid crystal display is driven, and signal distortion occurs, resulting in the formation of an afterimage. However, according to the present exemplary embodiment, the ground electrode 128, which is formed on the first substrate 110 in the matrix shape, is connected to a ground terminal of the non-display region to discharge static electricity, thus solving the above-mentioned problem.

Figure 4:
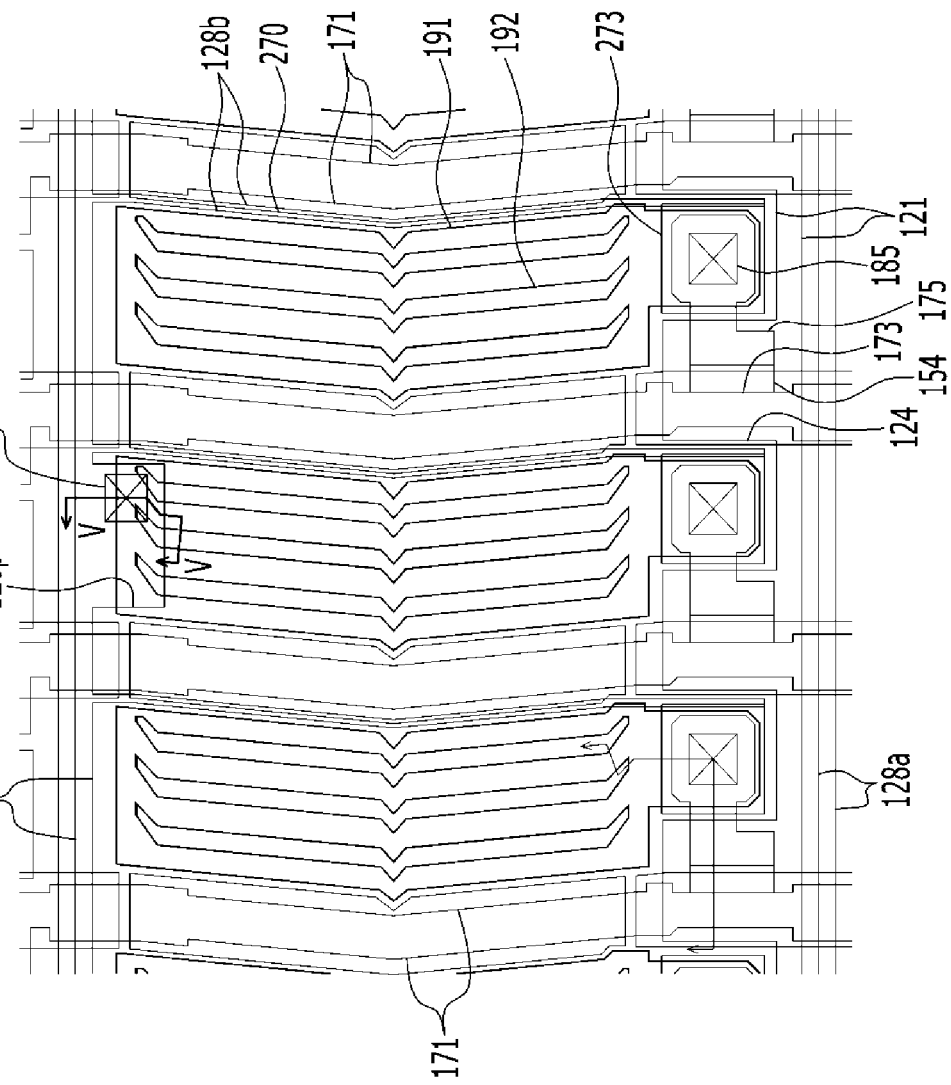
FIG. 4 is a top plan view illustrating a liquid crystal display according to another exemplary embodiment of the present invention.
Figure 5:
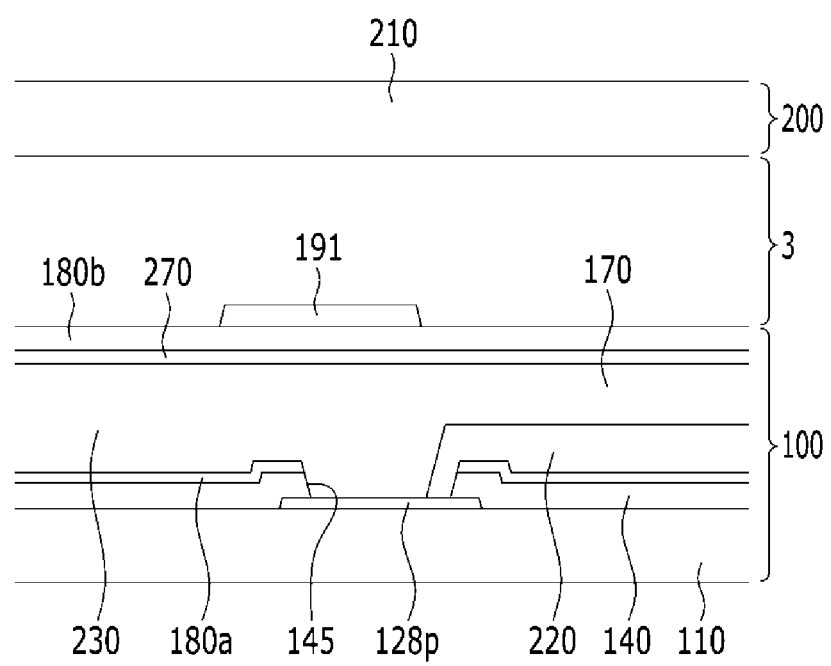
FIG. 5 is a cross-sectional view taken along line V-V of FIG. 4.

FIG. 4 is a top plan view illustrating a liquid crystal display according to another exemplary embodiment of the present invention. FIG. 5 is a cross-sectional view taken along line V-V of FIG. 4.

This exemplary embodiment, which will be described with reference to FIGS. 4 and 5, includes almost the same configuration as that of the exemplary embodiment described above with reference to FIGS. 1 to 3. Hereinafter, different parts will be mainly described.

Referring to FIGS. 4 and 5, the ground electrode 128, including the first ground electrode 128a and the second ground electrode 128b, is disposed on the first substrate 110, and the first ground electrode 128a includes a first ground electrode piece 128p which protrudes toward the pixel area where the pixel electrode 191, which is one of the field generating electrodes, is disposed. The first ground electrode piece 128*p* is disposed on the same layer as the first ground electrode 128*a*, and the gate insulating layer 140 and the first passivation layer 180*a* are disposed on the first ground electrode piece 128*p*. A part of an upper surface of the first ground electrode piece 128*p* is exposed through the contact hole 145 formed in the gate insulating layer 140 and the first passivation layer 180*a*.

The light blocking member 220 is disposed on the first passivation layer 180*a* and may be disposed at a location which overlaps the ground electrode 128, the gate line 121, the data line 171, and the semiconductor 154. The light blocking member 220 may cover a part of the first ground electrode piece 128*p*.

A color filter 230 is disposed on the light blocking member 220 and the first passivation layer 180*a*, and the color filter 230 is in direct contact with the first ground electrode piece 128*p* through the contact hole 145 formed in the gate insulating layer 140 and the first passivation layer 180*a*.

As described above, according to the present exemplary embodiment, the first ground electrode piece 128*p* is in direct contact with the color filter 230 through the contact hole 145 so that not only static electricity generated in the first substrate 110 but also static electricity generated in the color filter 230 may be effectively discharged. In addition, static electricity generated in the organic layer 170 disposed directly on the color filter 230 may be discharged along with the static electricity generated in the first substrate 110 and the static electricity generated in the color filter 230.

An example of the liquid crystal display is described above in which both of the common electrode 270 and the pixel electrode 191 are disposed on the lower panel 100, and an electric field is generated between a planar common electrode 270 and a linear pixel electrode 191, but the liquid crystal display is not limited thereto. For example, when thick constituent elements such as the light blocking member 220, the color filter 230, or the organic layer 170 are disposed on the lower panel 100, the static electricity generated in the first substrate 110 may become troublesome, and thus the exemplary embodiment according to the present invention may be applied even to a liquid crystal display of a different type, such as a vertical alignment (VA) mode, when a thick constituent element such as the organic layer 170 is disposed on the lower panel 100.

According to exemplary embodiments of the present invention, the display device includes a ground electrode formed on the substrate in a matrix shape to discharge static electricity generated in the substrate or the color filter to a ground terminal, thereby preventing a defect.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device, comprising:
   a first substrate;
   a ground electrode disposed on the first substrate;
   a thin film transistor disposed on the first substrate;
   a first passivation layer disposed on the thin film transistor;
   a light blocking member and a color filter disposed on the first passivation layer; and
   a field generating electrode disposed on the light blocking member and the color filter,
   wherein the ground electrode is arranged in a matrix and is connected to a ground terminal.

2. The display device of claim 1, wherein the ground electrode is disposed at or below a level in which a gate line connected to the thin film transistor is disposed.

3. The display device of claim 2, further comprising an organic layer disposed between the field generating electrode and the light blocking member or the color filter.

4. The display device of claim 3, wherein the ground electrode comprises:
   a first ground electrode extending in a direction parallel to the gate line; and
   a second ground electrode extending in a direction parallel to a data line connected to the thin film transistor.

5. The display device of claim 4, wherein the first ground electrode is disposed adjacent to the gate line.

6. The display device of claim 5, wherein the second ground electrode does not cross the gate line.

7. The display device of claim 1, further comprising:
   a residual ground electrode disposed below the gate line connected to the thin film transistor,
   wherein the residual ground electrode is disposed at a same layer as the ground electrode.

8. The display device of claim 7, wherein the residual ground electrode comprises a same material as the ground electrode.

9. The display device of claim 8, wherein the residual ground electrode is insulated from the ground electrode.

10. The display device of claim 1, further comprising:
    a gate line and a data line connected to the thin film transistor,
    wherein the ground electrode comprises a first ground electrode extending in a direction parallel to the gate line and a second ground electrode extending in a direction parallel to the data line, and the second ground electrode is connected to the thin film transistor.

11. The display device of claim 10, wherein the first ground electrode comprises a first ground electrode piece that overlaps a pixel area where the field generating electrode is positioned.

12. The display device of claim 11, wherein the first ground electrode piece comprises a contact hole and is in contact with the color filter through the contact hole.

13. The display device of claim 12, further comprising:
    a gate insulating layer covering the gate line,
    wherein the contact hole is formed to pass through the gate insulating layer and the first passivation layer.

14. The display device of claim 13, further comprising an organic layer disposed on the color filter.

15. The display device of claim 1, wherein the ground electrode overlaps the light blocking member.

16. The display device of claim 1, wherein the field generating electrode comprises:
    a pixel electrode;
    a common electrode; and
    an insulating layer is disposed therebetween.

17. The display device of claim 16, wherein the pixel electrode comprises cutouts, and the common electrode is planar.

18. The display device of claim 17, further comprising:
    a second substrate facing the first substrate; and
    a spacer disposed between the first substrate and the second substrate.

19. The display device of claim 18, further comprising a colored member disposed on the field generating electrode and overlapping the thin film transistor.

20. The display device of claim 19, wherein the spacer and the colored member are disposed on the same layer.

* * * * *